(12) United States Patent
Takano et al.

(10) Patent No.: US 8,224,173 B2
(45) Date of Patent: Jul. 17, 2012

(54) IMAGING APPARATUS

(75) Inventors: Manji Takano, Amagasaki (JP); Kazuhiro Shibatani, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 178 days.

(21) Appl. No.: 12/839,650

(22) Filed: Jul. 20, 2010

(65) Prior Publication Data

US 2011/0019990 A1 Jan. 27, 2011

(30) Foreign Application Priority Data

Jul. 21, 2009 (JP) ................................. 2009-169953

(51) Int. Cl.
*G03B 5/06* (2006.01)
(52) U.S. Cl. .......... 396/133; 396/55; 359/824; 348/357; 348/208.7
(58) Field of Classification Search .................. 348/357; 359/824; 396/55, 133
See application file for complete search history.

(56) References Cited

U.S. PATENT DOCUMENTS

| | | | | |
|---|---|---|---|---|
| 5,745,800 A * | 4/1998 | Kanbara et al. | .................. | 396/55 |
| 6,160,959 A * | 12/2000 | Mizumoto | ...................... | 396/55 |
| 6,232,697 B1 * | 5/2001 | Mizumoto | ...................... | 310/317 |
| 7,548,685 B2 * | 6/2009 | Mashima et al. | ................ | 396/53 |
| 7,623,159 B2 * | 11/2009 | Wada et al. | .................. | 348/222.1 |
| 7,881,166 B2 * | 2/2011 | Kamioka | .................... | 369/44.32 |
| 2007/0242938 A1 | 10/2007 | Uno et al. | | |
| 2010/0245963 A1 * | 9/2010 | Shibatani | .................... | 359/221.2 |

FOREIGN PATENT DOCUMENTS

| JP | 2006023556 A | * | 1/2006 |
|---|---|---|---|
| JP | 2006-091208 A | | 4/2006 |
| JP | 2006-126712 A | | 5/2006 |
| JP | 2007-286318 A1 | | 11/2007 |

* cited by examiner

*Primary Examiner* — Clayton E LaBalle
*Assistant Examiner* — Leon W Rhodes, Jr.
(74) *Attorney, Agent, or Firm* — Brinks Hofer Gilson & Lione

(57) ABSTRACT

A small imaging apparatus (1) implementing an optical image stabilizing function has a vibratory driving device (3) which comprises a driving shaft (7), an electromechanical transducer (6) consisting of a plurality of elongatable portions capable of elongating and contracting in an axial direction of the driving shaft (7) respectively and integrated with each other, and a driving member (8) slidably engaging on the driving shaft (7); a axially movable optical member (10) of which position is restrained in the axial direction by the driving member (8); and a vertically movable optical member (9, 11) of which position is restrained in a direction perpendicular to the axial direction by the driving shaft (7), the elongatable portions uniformly elongating and contracting repeatedly to displace the driving member (8) slidingly on the driving shaft (7), and unequally elongating or contracting to incline the driving shaft (7) to displace the driving member (8).

9 Claims, 9 Drawing Sheets

IMAGING APPARATUS

This application is based on application No. 2009-169953 filed in Japan, the contents of which are hereby incorporated by reference.

FIELD OF THE INVENTION

The present invention relates to a imaging apparatus.

DESCRIPTION OF THE RELATED ART

There is a high need for imaging apparatuses, for instance a camera unit of a cellular telephone, having sophisticated functions such as a automatic focusing, an optical zooming and an optical image stabilizing (anti-shake) while being small in size. For implementation of these functions, a driving device to move a lens or another element is required. With providing a multi functionality to a imaging device, a plurality of driving devices is required, and therefore a problem on which the imaging device comes to being large not only being expensive is raised.

For instance, in JP 2006-91208 A, there is described an imaging apparatus driving a lens in a direction of optical axis by vibratory driving device using electromechanical transducer. Further, in JP 2007-286318 A, there is described a image stabilizing device driving a lens in a plane perpendicular to an optical axis by two vibratory driving devices. A combination of these techniques requires three actuators in total to implement both of the automatic focusing (or zooming) function and the image stabilizing function.

Additionally, JP 2006-126712 A describes an imaging apparatus provided with an image stabilizing system inclining a hole lens barrel which houses a optical system having a plurality of lenses and a imaging element, with a shape-memory-alloy actuator. However, this technique is not capable of reducing number of actuators.

SUMMARY OF THE INVENTION

In view of the above problems, an object of the present invention is to provide a small imaging apparatus which implements an optical image stabilizing function while having a simple construction.

In order to achieve the objects of the present invention, there is provided an imaging apparatus having: a vibratory driving device which comprises a driving shaft, an electromechanical transducer consisting of a plurality of elongatable portions capable of elongating and contracting in an axial direction of the driving shaft respectively and integrated with each other, and a driving member slidably engaging on the driving shaft; a axially movable optical member which position is restrained in the axial direction by the driving member; and a vertically movable optical member which position is restrained in a direction perpendicular to the axial direction by the driving shaft, and wherein the plurality of elongatable portions uniformly elongates and contracts repeatedly at different speeds between the elongating direction and the contracting direction so as to displace the driving shaft back and force asymmetrically in the axial direction to displace the driving member slidingly with respect to the driving shaft, and the elongatable portions unequally elongate or contract so as to bend the electromechanical transducer to incline the driving shaft to displace the driving member according to the inclination of the driving shaft.

According to this construction, by elongating and contracting equally all of the elongatable portions of the electromechanical transducer in an asymmetrical manner in the elongating direction and the contracting direction, the driving member can be slidingly displaced along the driving shaft so as to move the axially movable optical member in the direction of the optical axis. Alternatively, by elongating and contracting the elongatable portions of the electromechanical transducer in an imbalanced manner, the driving shaft can be inclined so as to displace the vertically movable optical member in the direction perpendicular to the optical axis. Thereby, only one vibratory driving device of a conventional size can actuate both operations of the axially movable optical member (such as lens) for optical zooming or automatic focusing and of the vertically movable optical member (such as lens and/or imaging element) for image stabilizing. Thus, the multi functional imaging apparatus according to the present invention has a reduced size.

In the imaging apparatus of the present invention, the vertically movable optical member may be fixed in a lens barrel held by the driving shaft and may include an imaging element.

According to this construction, the lens barrel can be inclined by the inclination of the driving shaft so as to perform the image stabilization with inclining the whole imaging optical system. Therefore, relative position of each component of the optical system is not changed due to the image stabilization. Accordingly, obtained images are never skewed.

In the imaging apparatus of the present invention, the lens barrel may be held by the driving shaft with interposition of elastic member which absorbs an axial vibration of the driving shaft.

According to this construction, when the axially movable optical member is actuated for zooming or focusing, the lens barrel is not shaken by the vibration of the driving shaft, and therefore the electromechanical transducer does not consume extra energy.

In the imaging apparatus of the present invention, the lens barrel may be slidably held by the driving shaft and the position of the lens barrel may be restrained in the axial direction by a base member holding the electromechanical transducer.

Also according to this construction, when the axially movable optical member is actuated for zooming or focusing, the lens barrel is not shaken by the vibration of the driving shaft, and therefore the electromechanical transducer does not consume extra energy.

In the imaging apparatus of the present invention, the axially movable optical member may slide along an guide shaft held in parallel with the driving shaft by a base member holding the electromechanical transducer, may be positioned in the axial direction of the driving shaft by the driving member, and may be movable relative to the driving shaft in the direction perpendicular to the driving shaft.

According to this construction, since the axially movable optical member does not incline with respect to the optical axis of the imaging apparatus, obtained images are never skewed due to the zooming or focusing.

In the imaging apparatus of the present invention, the axially movable optical member may be held movably in a plane perpendicular to the axial direction of the driving shaft by the base member, may be positioned in the direction perpendicular to the axial direction by the driving shaft, and may be movable relative to the driving shaft in the axial direction.

According to this construction, since the vertically movable optical member does not incline with respect to the optical axis of the imaging apparatus, obtained images are never skewed due to image stabilization.

The imaging apparatus of the present invention may further have a driving circuit which can apply direct-current voltage components opposite in polarity to the elongatable portions facing across a center axis of the electromechanical transducer and which can apply to all the elongatable portions a periodical alternating voltage component in same phase.

According to this construction, the electromechanical transducer can be efficiently bended by applying the direct-current voltage components opposite in polarity to the elongatable portions in opposite positions. There, applying the direct-current voltage components opposite in polarity means that the direct-current voltage components are same in voltage. Therefore, the construction of the driving circuit can be simplified. Further, by applying to all the elongatable portions the alternating voltage component in same phase, the electromechanical transducer is elongated and contracted in the axial direction so as to cause a sliding displacement of the driving member with respect to the driving shaft.

In the imaging apparatus of the present invention, all of the plurality of elongatable portions may have an identical size.

According to this construction, each elongatable portion has an equal elongation and contraction ability. Therefore, according to a direction and an amount of a desired inclination of the driving shaft, an elongation and contraction forces (applying voltages) required for respective elongatable portions are easily calculated.

In the imaging apparatus of the present invention, the number of the elongatable portions may be four, and the four elongatable portions may be arranged rotation symmetrically about a center axis of the driving shaft.

According to this construction, an elongation and contraction forces of elongatable portions to incline the driving shaft are respectively related to forces acting in positive or negative X-Y directions. Therefore, according to a direction and an amount of a desired inclination of the driving shaft, an elongation and contraction forces (applying voltages) required for respective elongatable portions are easily calculated.

As described above, according to the present invention, a single vibratory driving device capable of oscillating and inclining the driving shaft can drive both of an optical member to be positioned in the axial direction and another optical member to be positioned in the direction perpendicular to the optical axis. Accordingly, an imaging apparatus can be constructed simply and reduced in size.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENT

Figure 1:
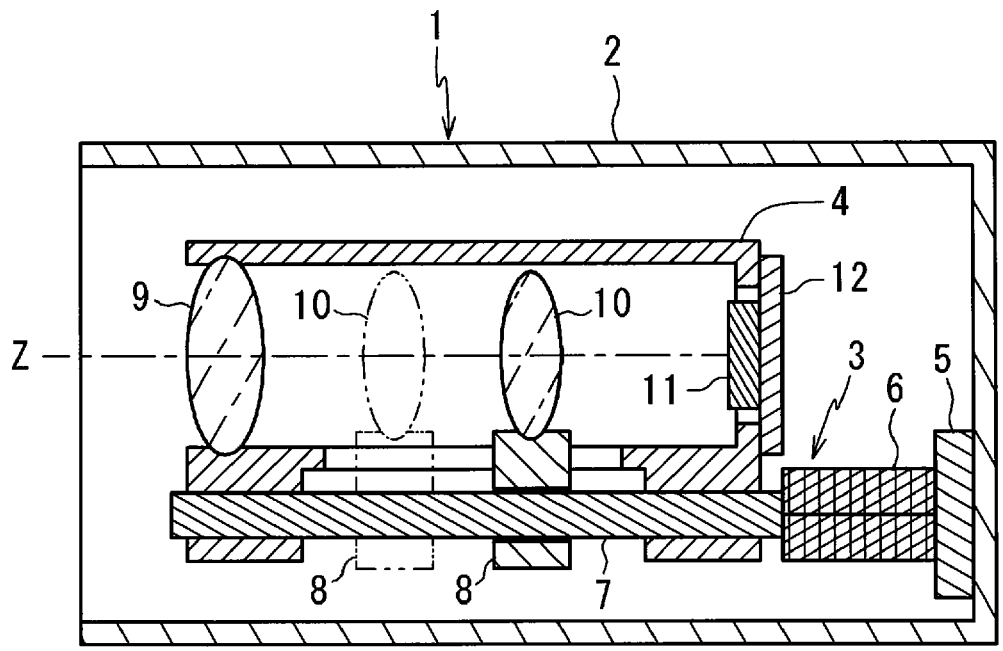
FIG. 1 is a schematic sectional view of first embodiment according to the present invention.

First, FIG. 1 shows a configuration of an imaging apparatus 1 as first embodiment according to the present invention. In the imaging apparatus 1, a base member (chassis) 2 contains a lens barrel 4 actuated by a vibratory driving device 3.

The vibratory driving device 3 comprises a weight 5 fixed to the base member 2, electromechanical transducer 6 of which one end is fixed to the weight 5, a driving shaft 7 held on the other end of the electromechanical transducer 6 and a driving member slidably engaging frictionally on the driving shaft 7. The lens barrel 4 is fixed to the driving shaft 7 (a position in axial direction of the driving shaft and distance from the driving shaft 7 in a direction orthogonal to the driving shaft 7 are fixed).

An object lens 9 is fixed at the front end of the lens barrel 4. A focusing lens (axially movable optical member) 10 which is held by the driving member 8 of the vibratory driving device 3 is contained in the lens barrel 4. A circuit board 12 having an imaging element 11 which transforms a projected image into electrical signal (take an image) is fixed at the back end of the lens barrel 4. The object lens 9 and the focusing lens 10 configures an optical system to project an image of the photographic subject on the imaging element 11. The focusing lens 10 moves along a Z axis parallel to the driving shaft 7 according to the movement of the driving member 8 on the driving shaft 7 to adjust the focal point distance.

Figure 2:
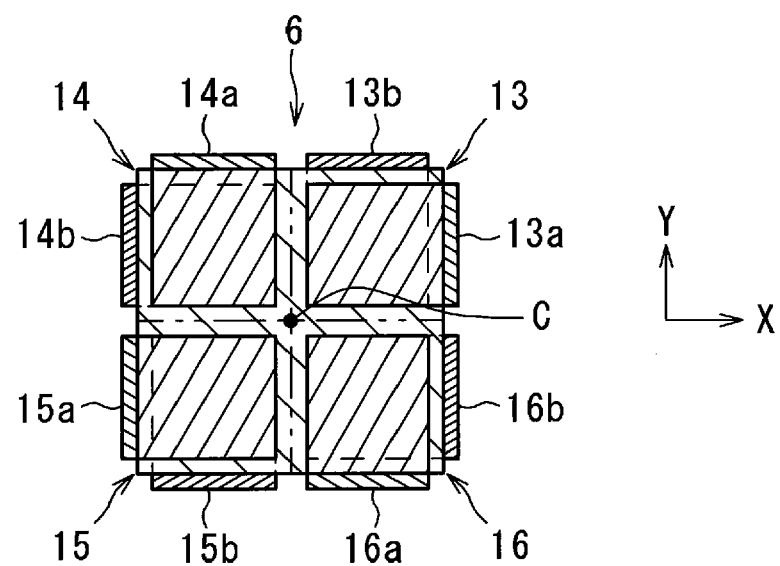
FIG. 2 is a sectional view of the electromechanical transducer in FIG. 1.

FIG. 2 shows a cross section of the electromechanical transducer 6. The electromechanical transducer 6 is divided into four in X-Y direction orthogonal to the optical axis Z so as to form four elongatable portions 13, 14, 15, 16 which are constructed by staking up piezoelectric material layers and conductive material layers alternately. The elongatable portions 13, 14, 15, 16 are arranged rotation symmetrically about the center axis C of the electromechanical transducer 6 at every 90 degrees and integrated with each other. The elongatable portions 13, 14, 15, 16 are respectively provided with external electrodes (13a, 13b), (14a, 14b), (15a, 15b), (16a, 16b) which connect every other conductive material layers to each other on the side faces. In this embodiment, each piezoelectric material layer of the elongatable portions 13, 14, 15, 16 are polarized so as to elongate with positive voltages applied on the external electrodes 13a, 14a, 15a, 16a. Since the elongatable portions 13, 14, 15, 16 have an identical size, these exert same elongation or contraction force with same voltage applied.

Figure 3:
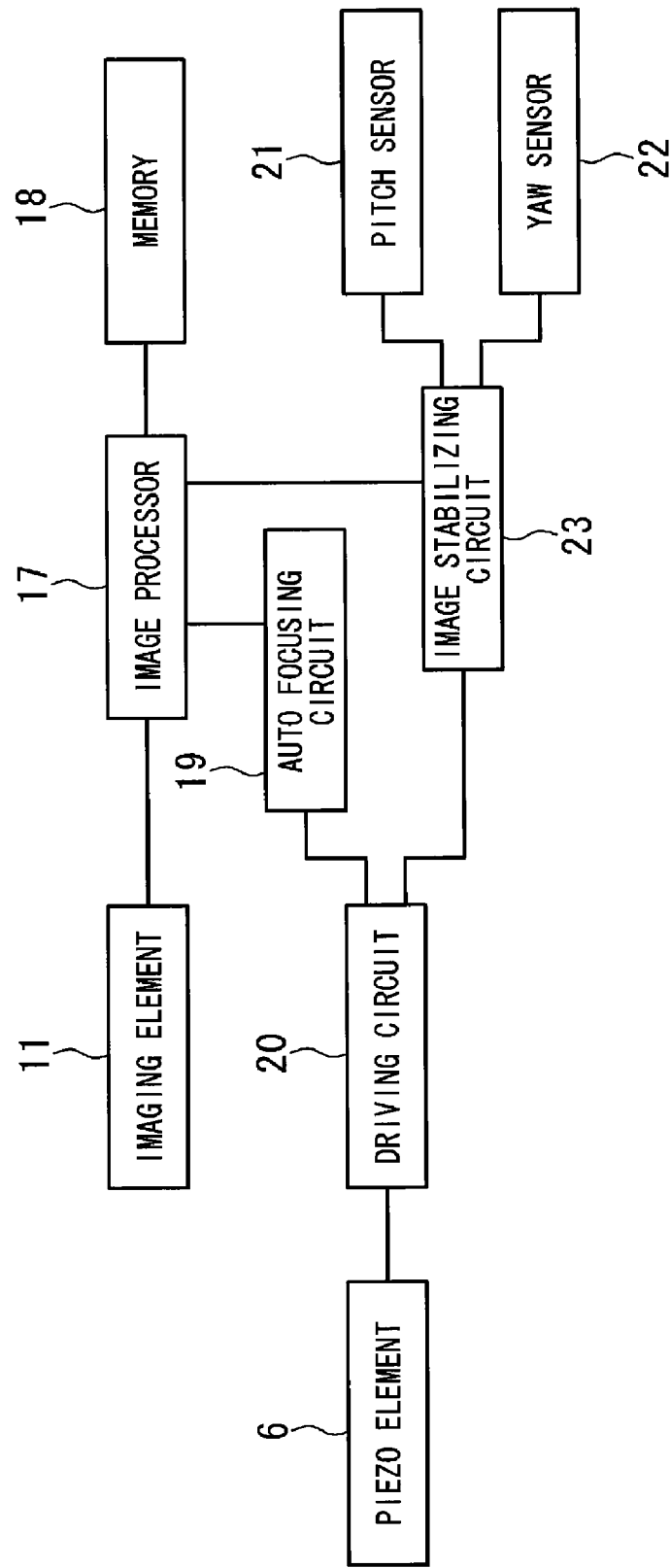
FIG. 3 is a configuration diagram with respect to a control of the imaging apparatus in FIG. 1.

FIG. 3 shows a configuration with respect to the drive control of the vibratory driving device 3 of the imaging apparatus 1. The imaging apparatus 1 has an image processing IC 17 which processes an image signal taken by the imaging element 11, a memory storing the image signal, an auto-focus processing circuit 19 which detects a defocus in the processed image signal to calculate a distance for the focusing lens 10 to be driven, a driving circuit 20 which applies a driving voltage to the electromechanical transducer 6 to drive the vibratory driving device 3 in response to the output of the auto-focus processing circuit 19, a pitch sensor 21 and a yaw sensor 22, and an image stabilizing circuit 23 which calculates inclination angle for the lens barrel 4 to be inclined so as to keep the lens barrel 4 facing straight to the photographic subject based on the detection signal of the pitch sensor 21 and the yaw sensor 22. The driving circuit 20 is also configured to apply a driving voltage to the electromechanical transducer 6 so as to drive the vibratory driving device 3 in response to the output of the image stabilizing circuit 23.

Figure 4:
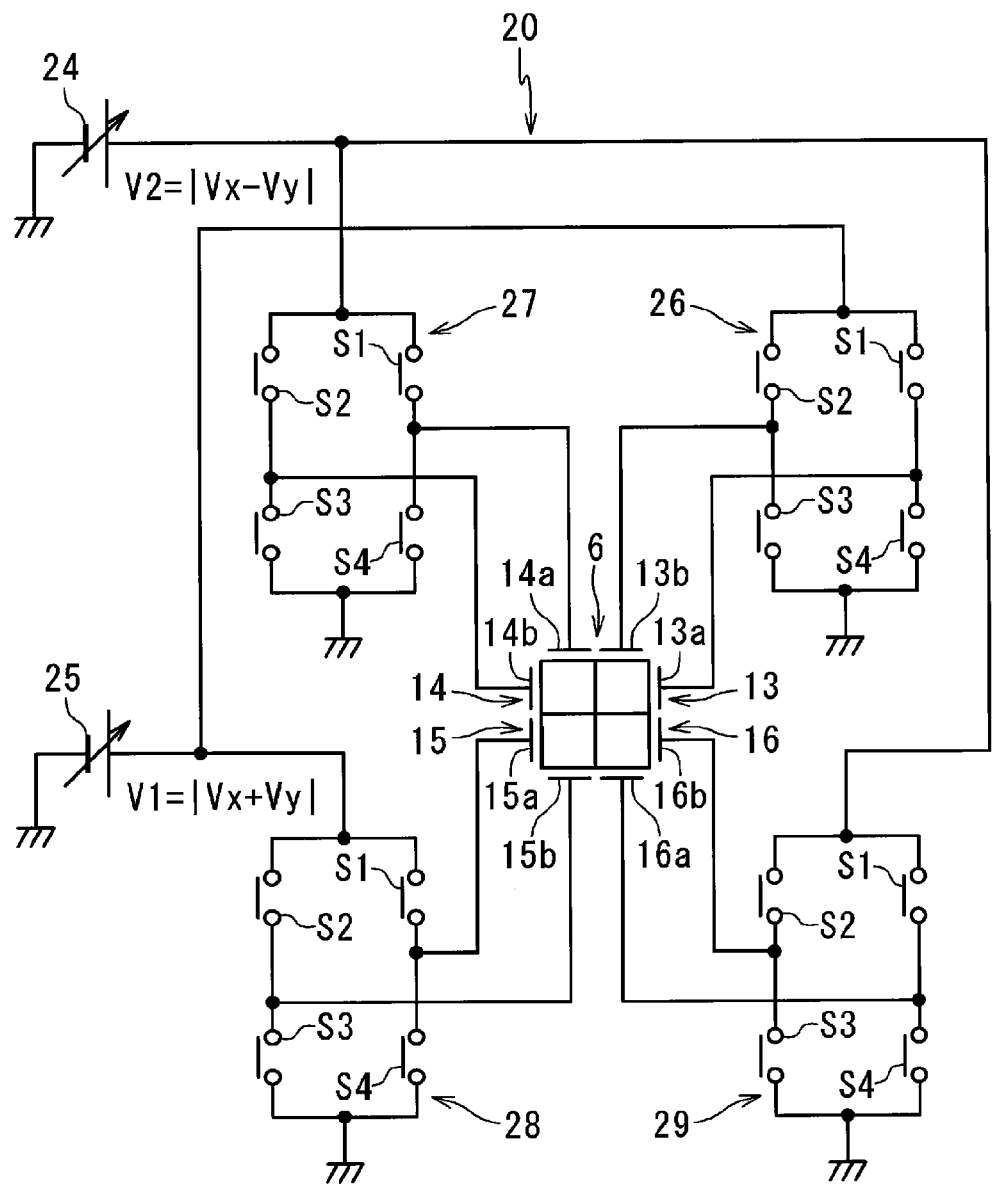
FIG. 4 is a circuit diagram of the driving circuit in FIG. 3.

FIG. 4 shows the configuration of the driving circuit 20. The driving circuit 20 has two variable voltage direct current sources 24, 25 and four bridge circuits 26, 27, 28, 29. The bridge circuit 26, 28 can connect the external electrodes (13a, 13b), (15a, 15b) of the elongatable portions 13, 15 to the variable voltage direct current source 24 or the ground respectively. And the bridge circuits 27, 29 can connect the external electrodes (14a, 14b), (16a, 16b) of the elongatable portions 14, 16 to the variable voltage direct current source 25 or the ground respectively.

The bridge circuits 26, 27, 28, 29 respectively have switching elements S1, S2, S3, S4. The switching elements S1, S2, S3, S4 are switching controlled by an unshown microcomputer.

If the opening and closing patterns of the switching elements S1, S2, S3, S4 of each bridge circuits 26, 27, 28, 29 are synchronized, the elongation portions 13, 14, 15, 16 can be applied a voltage in same phase. By setting the variable voltage direct current sources 24, 25 at the same voltage and by closing the switching elements S1 and S4 or the switching elements S2 and S3, the elongatable portions 13, 14, 15, 16 are equally elongated or contracted. If the elongatable portions 13, 14, 15, 16 are applied the same alternating voltage component which has a periodical waveform (for instance, a rectangular wave with a duty ratio of 0.3 or 0.7) causing the elongatable portions 13, 14, 15, 16 to elongate and contract repeatedly at different elongating speed and contacting speed from each other so as to oscillate asymmetrically the driving shaft 7 in the axial direction, the driving member 8 can be slidingly displaced with respect to the drive shaft 7.

Figure 5:
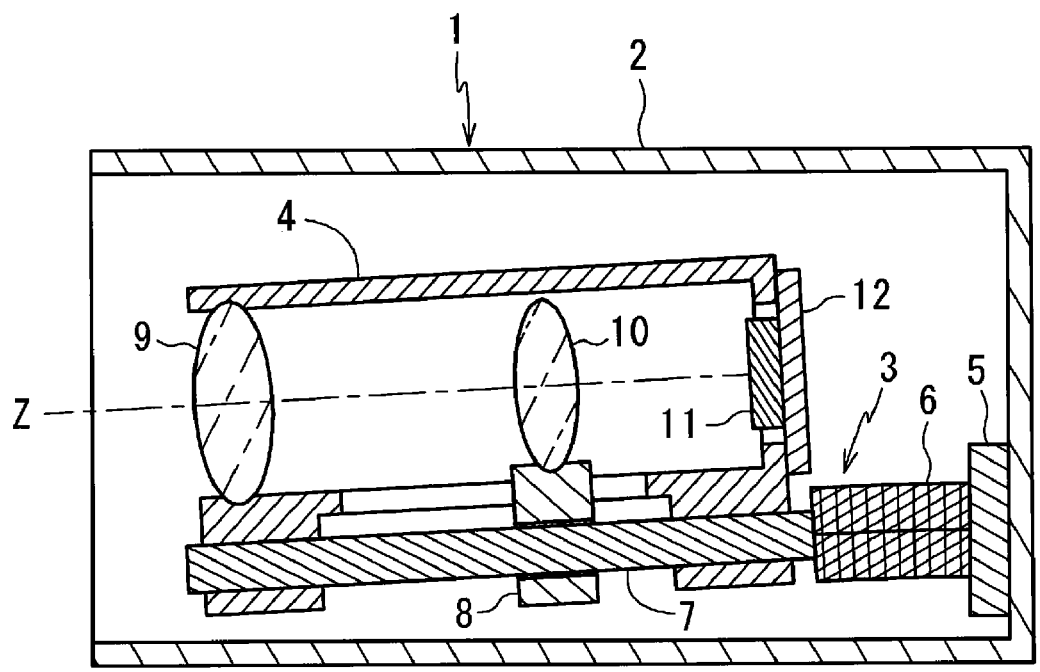
FIG. 5 is a schematic sectional view of the imaging apparatus in FIG. 1 when image stabilization.

Alternatively, if the elongatable portions 13, 14, 15, 16 are applied direct-current voltage components at least one of which has different voltage from others, the elongatable portions 13, 14, 15, 16 occurs an imbalance in their length. Therefore, the electromechanical transducer curves so as to incline the driving shaft 7. If the opening and closing states of the switching elements S1, S4 and S2, S3 are reversed between in the bridge circuit 26 and in the bridge circuit 28 and between in the bridge circuit 27 and in the bridge circuit 29 respectively, the polarity of the respective elongatable portions 13, 14, 15, 16 are reversed with respect to the polarity of one in a position facing across the center axis. Therefore, the difference in amounts of elongation and contraction between the each two of the elongatable portions 13, 14, 15, 16 facing across the center axis each other is enhanced. By applying the direct-current voltage components as above to elongate or contract the elongatable portions 13, 14, 15, 16 unequally so as to bend the electromechanical transducer 6, as shown in FIG. 5, the driving shaft 7 is inclined together with the lens barrel 4. Accordingly, the optical axis Z of the optical system involving vertically movable optical members (the object lens 9 and the imaging element 11) which are fixed to the lens barrel 4 held by the driving shaft 7 can be inclined.

Since the elongatable portions 13, 14, 15, 16 are arranged rotation symmetrically, the elongatable portions 13, 14, 15, 16 respectively contribute to inclination of the driving shaft 7 equally in amount relative to applied voltage and differently in direction at every 90 degrees. Therefore, the elongatable portions 13, 14, 15, 16 have inclining effects for the driving shaft 7 just in different combination of positive or negative in the X direction and the Y direction from each other. Accordingly, voltages applied to the elongatable portions 13, 14, 15, 16 are easily related to inclination amounts and directions of the driving shaft.

Here, a desired inclination amounts of the driving shaft 7 in X-Y directions calculated by the image stabilizing circuit 23 are stated as (x, y). Under the assumption that the inclination amount x is obtained by applying a voltage of +Vx to the elongatable portions 13, and applying a voltage of −Vx to the elongatable portions 14, 15, and the inclination amount y is obtained by applying a voltage of +Vx to the elongatable portions 13, and applying a voltage of −Vx to the elongatable portions 15, 16. The desired inclination amount (x, y) may be obtained, by applying a voltage of (Vx+Vy) to the elongatable portion 13, a voltage of (−Vx+Vy) to the elongatable portion 14, a voltage of (−Vx−Vy) to the elongatable portion 15, a voltage of (Vx−Vy) to the elongatable portion 16.

Since the variable voltage direct current sources 24, 25 can output only a positive voltage, a set value of voltage V1 for the variable voltage direct current sources 24 is set at |Vx+Vy| as the absolute value of (Vx+Vy) and (−Vx−Vy), and a set value of voltage V1 for the variable voltage direct current sources 25 is set at |Vx−Vy| as the absolute value of (−Vx+Vy) and (Vx−Vy). And the switching elements S1, S3 or the switching elements S2, S4 are chosen for each of the bridge circuits 26, 27, 28, 29 so as to provide a required polarity to each of the elongatable portions 13, 14, 15, 16 respectively.

As described above, the imaging apparatus 1 can perform both of the focusing operation in which the driving member 8 is slidingly displaced in the Z direction to drive the focusing lens 9 and the image stabilization operation in which the driving shaft 7 is inclined in the X-Y direction to drive the lens barrel 4, with only one vibratory driving device 3. Therefore, the imaging apparatus 1 has a simplified configuration, hence can be downsized.

Figure 6:
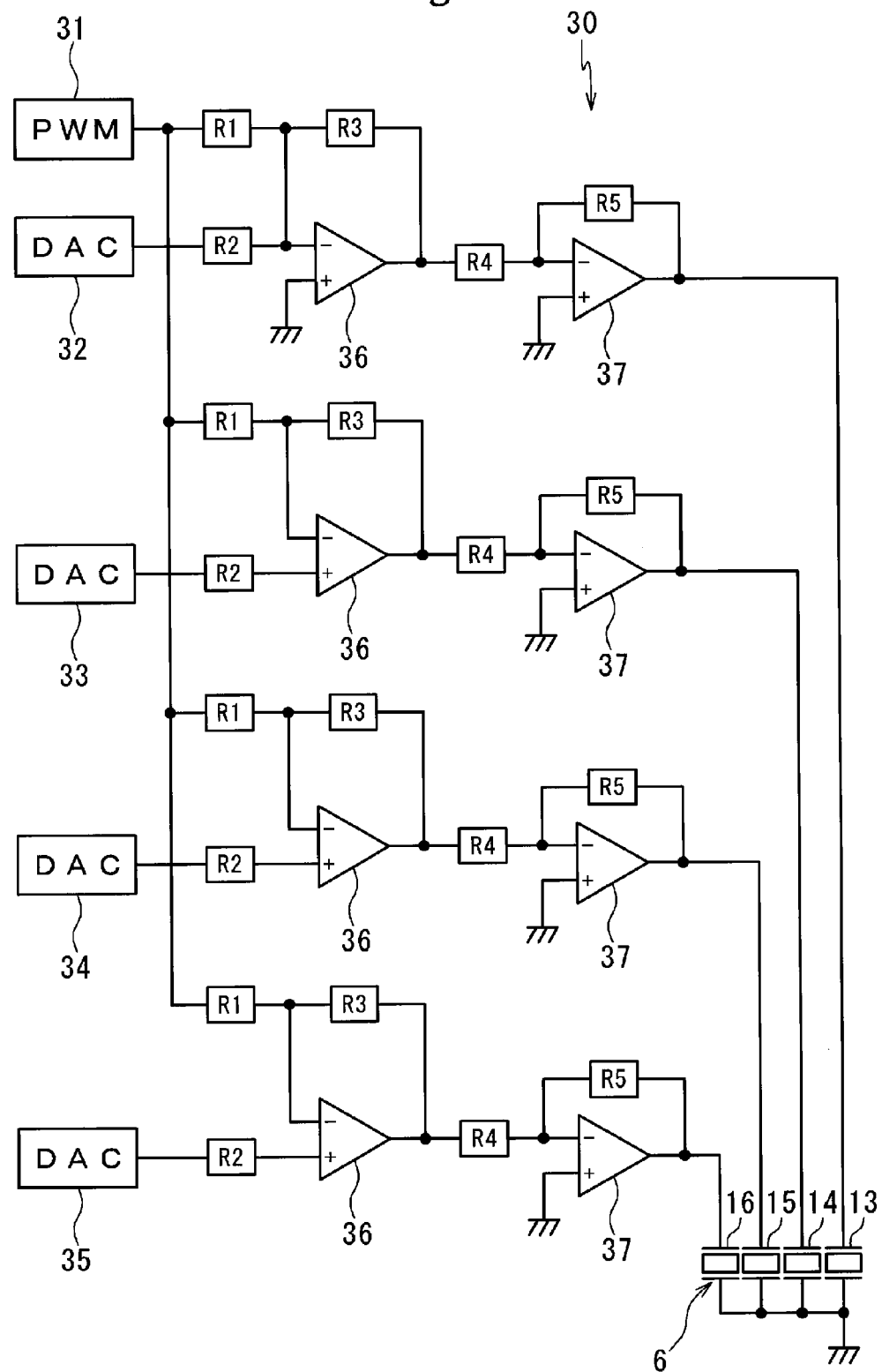
FIG. 6 is a circuit diagram of an alternative driving circuit for the driving circuit in FIG. 4.

FIG. 6 shows an alternative driving circuit 30 to the driving circuit 20 in FIG. 4. The driving circuit 30 has one rectangular wave oscillator (PWM) 31 and four direct-current voltage generators (D/A convertor) 32, 33, 34, 35. Both of the rectangular wave oscillator 31 and the direct-current voltage generators 32, 33, 34, 35 are controlled by an unshown microcomputer. Adders 36 add on the output of the rectangular wave oscillator 31 to the outputs of the direct-current voltage generators 32, 33, 34, respectively. Subsequently, amplifiers 37 amplify the superposed voltages of the outputs of the direct-current voltage generators 32, 33, 34, 35 and the output of the rectangular wave oscillator 31 and apply it to the elongatable portions 13, 14, 15, 16 respectively.

In this embodiment, since the polarity of the voltage applied to the elongatable portions 13, 14, 15, 16 can not be chosen, an middle voltage of the available voltage is determined as an origin so that the lens barrel 4 can be driven positively and negatively in X-Y direction respectively. In this embodiment, an alternating voltage component caused by the rectangular wave oscillator 31 and a direct-current voltage component caused by the direct-current voltage generators 32, 33, 34, 35 are applied in an superposing manner to the elongatable portions 13, 14, 15, 16. Therefore, the imaging apparatus 1 can perform an image stabilization with inclining the lens barrel 4 and a focusing with driving the driving member 8 simultaneously.

Figure 7:
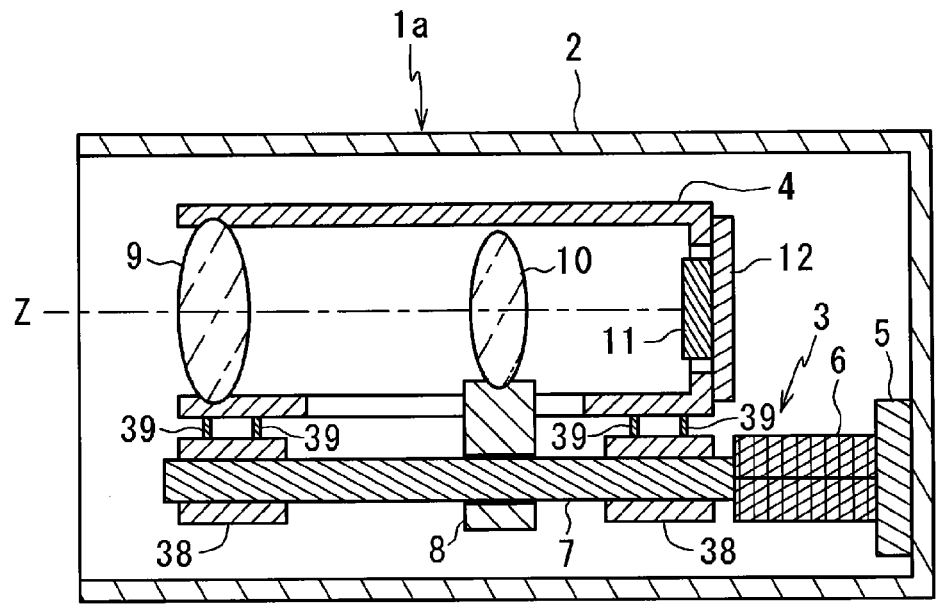
FIG. 7 is a schematic sectional view of second embodiment according to the present invention.

Next, FIG. 7 shows an imaging apparatus 1a as second embodiment according to the present invention. In the following description, components identical to those of the embodiment described before are designated by identical reference numerals to omit redundant explanation.

In the imaging apparatus 1a of this embodiment, the lens barrel 4 is held by a fixed body 38 fixed to the driving shaft 7 with an interposed elastic member 39 which can inflect in the axial direction of the driving shaft 7. In this embodiment, when the elongatable portions 13, 14, 15, 16 of the elector mechanical transducer 6 are elongated and contracted in a same phase so as to oscillate the driving shaft 7 in the axial direction to cause a sliding displacement of the driving member 8 for the auto-focusing, the vibration of the driving shaft 7 is absorbed by the elastic member 39, hence the lens barrel 4 does not vibrate in the axial direction. Therefore, the electromechanical transducer 6 is not required to generate any torque for driving the lens barrel 4 and consumes less electric power.

As in this embodiment, the vertically movable optical member (the object lens 9 and imaging element 11 in this embodiment) which is restrained in position in a direction orthogonal to the driving shaft 7 by inclination of the driving shaft 7 is preferably not restrained in position in the axial direction of the driving shaft 7.

Figure 8:
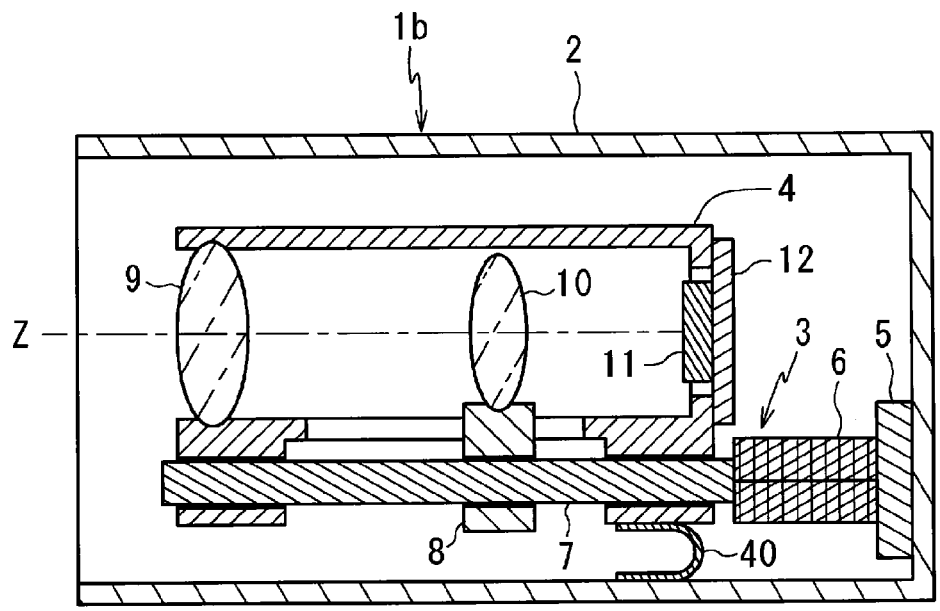
FIG. 8 is a schematic sectional view of third embodiment according to the present invention.

FIG. 8 shows an imaging apparatus 1b as third embodiment according to the present invention. In the imaging apparatus 1b, the lens barrel 4 is slidable on the driving shaft 7 and linked to the base member 2 with an "U" shaped spring member 40. The spring member 40 restrains the movement of the lens barrel 4 in the Z direction but does not exert great resistance against the inclination of the lens barrel 4 caused by the inclination of the driving shaft due to bending of the electromechanical transducer 6. In accordance with this configuration, the lens barrel 4 holding the vertically movable optical member can be independent from the oscillation of the driving shaft 7 in the axial direction.

Figure 9:
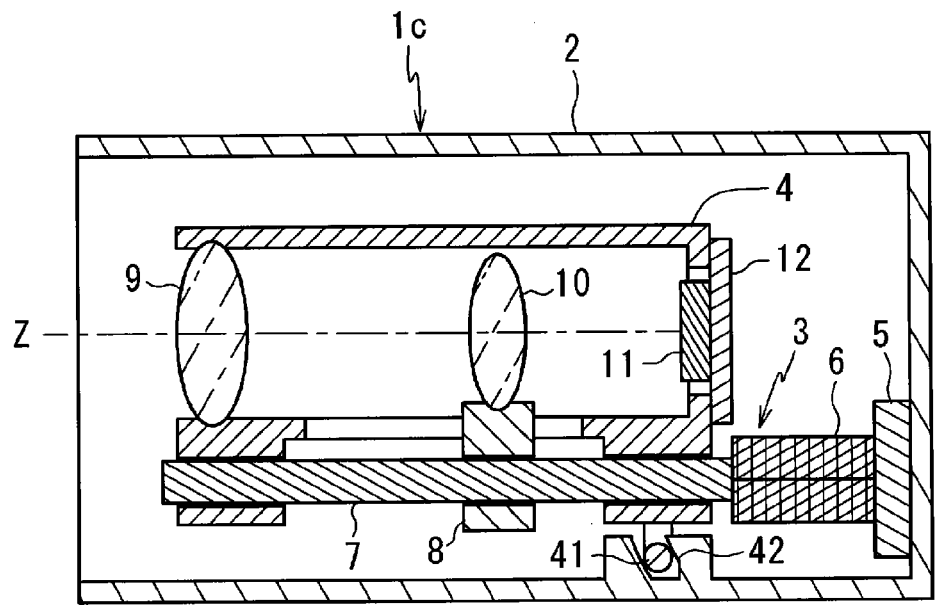
FIG. 9 is a schematic sectional view of fourth embodiment according to the present invention.

Further, as a imaging apparatus 1c as forth embodiment according to the present invention shown in the FIG. 9, a cam groove 42 may be provided on the base member 2 to hold a pin 41 provided on the lens barrel 4, instead of the spring member 40 in the imaging apparatus 1b as third embodiment.

Figure 10:
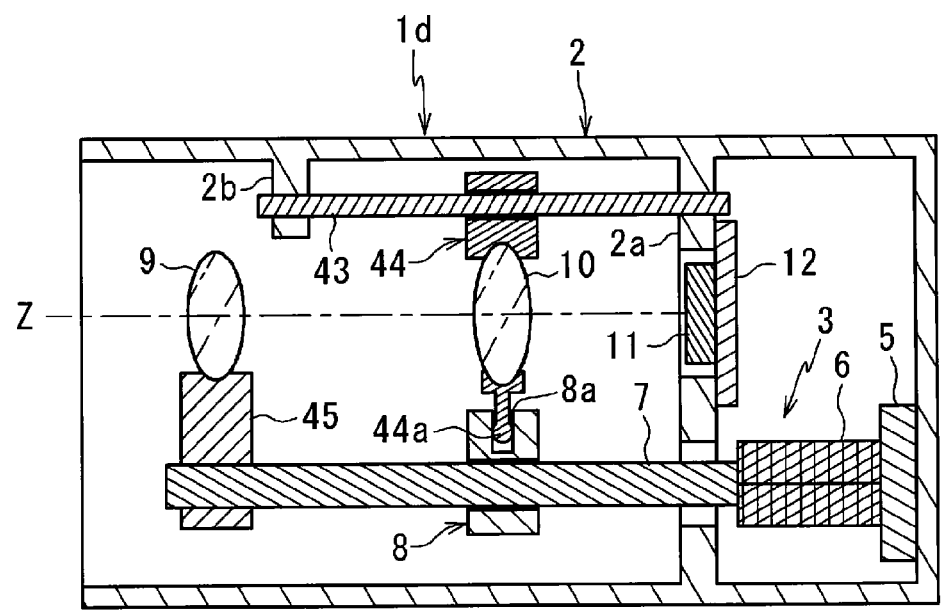
FIG. 10 is a schematic sectional view of fifth embodiment according to the present invention.

Furthermore, FIG. 10 shows an imaging apparatus 1d as fifth embodiment according to the present invention. In the imaging apparatus 1d of this embodiment, the base member 2 serves as a lens barrel. In the imaging apparatus 1d, the circuit board 12 having the imaging element 11 is fixed to an inner wall 2a of the base member 2. That means the vertically movable optical member in this embodiment is only the object lens 9. And, the focusing lens (axially movable optical member) 10 is held by a lens frame 44 which is slidable along a guide shaft 43 held by the inner wall 2a and rib 2b of the base member 2 parallel to the optical axis Z.

Figure 11:
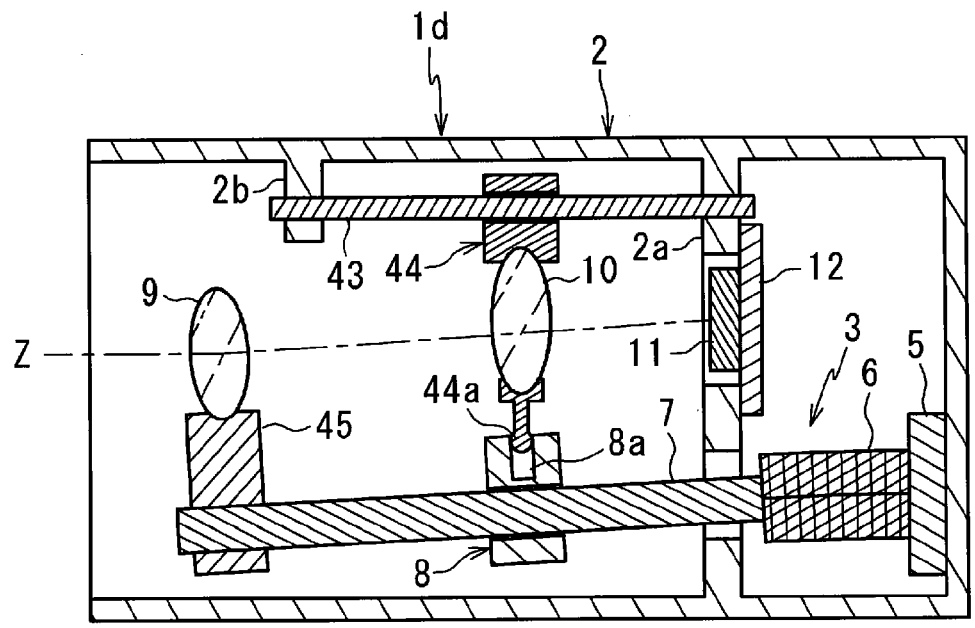
FIG. 11 is a schematic sectional view of the imaging apparatus in FIG. 10 when image stabilization.

The lens frame 44 has an engaging portion 44a which engages with an engaging groove 8a. Thereby, the lens frame 44 is positioned in the axial direction of the driving shaft 7 by the driving member 8. Since the engaging portion 44a is slidable in a direction perpendicular to the axis of the driving shaft 7 within the engaging groove 8a, the driving shaft 7 can get closer to or away from the focusing lens 10 when inclined by the curving of the electromechanical transducer 6 as shown in the FIG. 11 so that the optical center of the focusing lens 10 does not leave from the optical axis Z. In contrast, the focusing lens 10 is relatively movable to the driving shaft 7 in a substantially vertical direction.

Further, the object lens 9 held by the fixed member 5 fixed to the front end of the driving shaft 7 in this embodiment. Therefore, the object lens 9 is moved by the inclination of the driving shaft 7 so as to displace the optical axis Z of the imaging device 1d to move the position of the image of a photographic subject formed on the imaging element 11 in the X-Y direction. That means the object lens 9 serves a function as an image stabilizing lens displacing the optical axis of the optical system so as to compensate the moving of the position of the image of the photographic subject formed on the imaging element 11 due to the inclination of the base member 2.

It is noted that the object lens 9 should be configured to prevent the formed image on the imaging element 11 from defocusing partially when the object lens 9 is inclined together with the driving shaft 7, for instance using a combined lens, while the object lens 9 depicted in a simple configuration in the drawings. Also, in following embodiments, design conditions of the object lens 9 and the focusing lens 10 and the like will be different due to change in orientations of the optical members and others. However, it is not described in this application, because skilled in the art can make an appropriate optical design as necessary.

Figure 12:
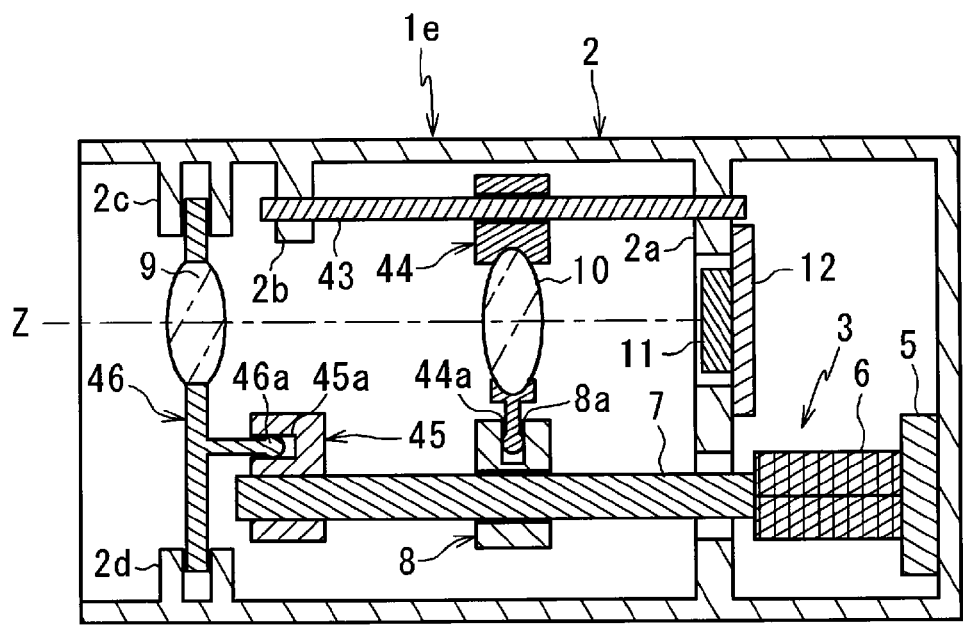
FIG. 12 is a schematic sectional view of sixth embodiment according to the present invention.
Figure 13:
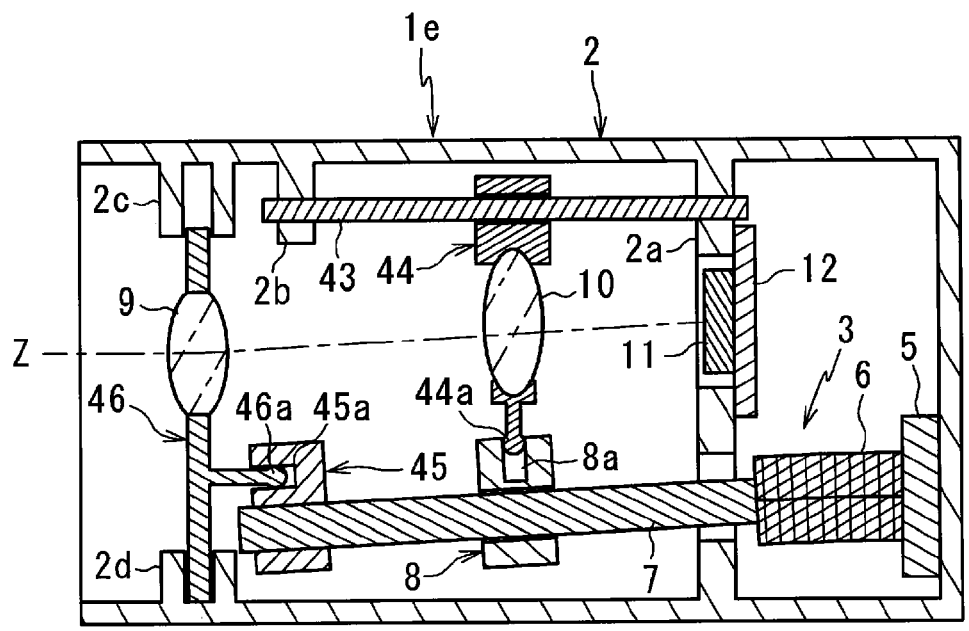
FIG. 13 is a schematic sectional view of the imaging apparatus in FIG. 12 when image stabilization.

FIG. 12 shows an imaging apparatus 1e as sixth embodiment according to the present invention. The imaging apparatus 1e is similar to the imaging apparatus 1d as the fifth embodiment excepting that the object lens (image stabilizing lens) 9 is held by a lens frame 46 which is slidably inserted into ribs 2c, 2d and which is movable only in the X-Y direction vertical to the driving shaft in the initial position. And the lens frame 46 is provided with a protruded engaging portion 46 so that the engaging portion 46 engages with a engaging groove 45a provided on the fixed member 45 fixed to the driving shaft 7. Thereby, as shown in FIG. 13, the lens frame 46 is positioned in the X-Y direction according to the inclination angle of the driving shaft 7 without moving in the Z direction.

In this embodiment, since the object lens 9 does not incline, conventional lens configuration can be applied to the image stabilizing lens.

Figure 14:
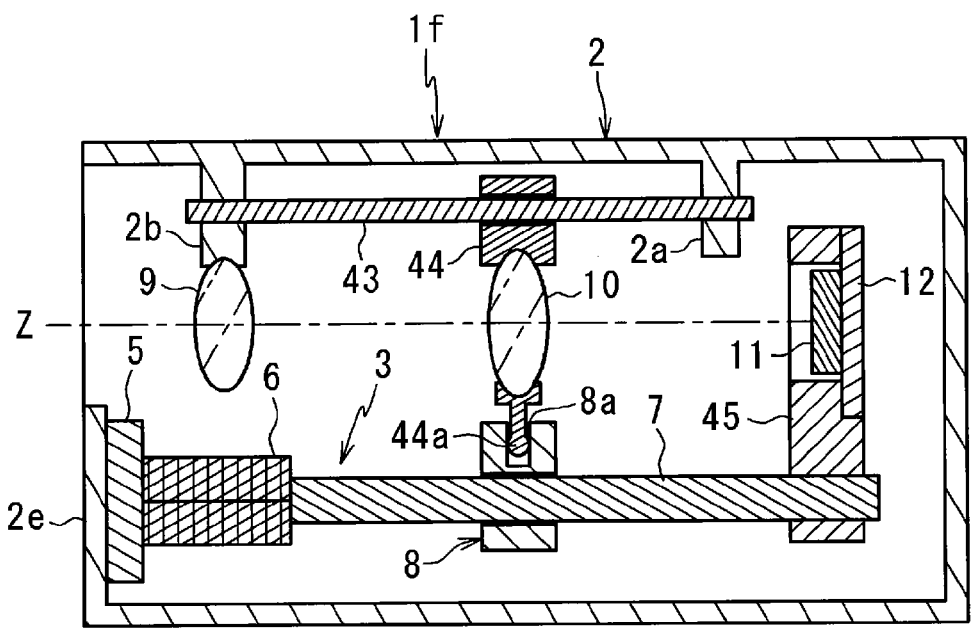
FIG. 14 is a schematic sectional view of seventh embodiment according to the present invention.

Furthermore, FIG. 14 shows an imaging apparatus if as seventh embodiment according to the present invention. In this embodiment, the object lens 9 is fixed to the rib 2b of the base member 2 and the imaging element 11 is held by the fixed member 45 fixed on the driving shaft 7. As this embodiment teaches, in the present invention, not the object lens 9 but the imaging element 11 may be arranged to be driven as a vertically movable optical member so as to be facing straight to a photographic subject at any time.

Moreover, in this embodiment, the imaging element 11 may be held as in a slidable manner in X-Y direction as the object lens 9 in the sixth embodiment so that the imaging element 11 is positioned in X-Y direction without inclination of the imaging surface of the imaging element 11.

As this embodiment teaches, in the present invention, an axially movable optical member or a vertically movable optical member may consist of any component taking part in an optical system for imaging such as an imaging element not only lens.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:
1. An imaging apparatus having:
   a vibratory driving device which comprises a driving shaft, an electromechanical transducer consisting of a plurality of elongatable portions capable of elongating and con- tracting in an axial direction of the driving shaft respectively and integrated with each other, and a driving member slidably engaging on the driving shaft;

an axially movable optical member of which position is restrained in the axial direction by the driving member; and a vertically movable optical member of which position is restrained in a direction perpendicular to the axial direction by the driving shaft, and wherein the plurality of elongatable portion uniformly elongates and contracts repeatedly at different speeds between the elongating direction and the contracting direction so as to displace the driving shaft back and forth asymmetrically in the axial direction to displace the driving member slidingly with respect to the driving shaft, and the elongatable portions unequally elongate or contract so as to bend the electromechanical transducer to incline the driving shaft to displace the driving member according to the inclination of the driving shaft.

2. The imaging apparatus as claimed in claim 1, wherein the vertically movable optical member is fixed in a lens barrel held by the driving shaft and includes an imaging element.

3. The imaging apparatus as claimed in claim 2, wherein the lens barrel is held by the driving shaft with interposition of elastic member which absorbs an axial vibration of the driving shaft.

4. The imaging apparatus as claimed in claim 2, wherein the lens barrel is slidably held by the driving shaft and the position of the lens barrel is restrained in the axial direction by a base member holding the electromechanical transducer.

5. The imaging apparatus as claimed in claim 1, wherein the axially movable optical member slides along a guide shaft held in parallel with the driving shaft by a base member holding the electromechanical transducer, is positioned in the axial direction of the driving shaft by the driving member, and is movable relative to the driving shaft in the direction perpendicular to the driving shaft.

6. The imaging apparatus as claimed in claim 5, wherein the axially movable optical member is held movably in a plane perpendicular to the axial direction of the driving shaft by the base member, is positioned in the direction perpendicular to the axial direction by the driving shaft, and is movable relative to the driving shaft in the axial direction.

7. The imaging apparatus as claimed in claim 1, further having a driving circuit which can apply direct-current voltage components opposite in polarity to the elongatable portions facing across a center axis of the electromechanical transducer and which can apply to all the elongatable portions a periodical alternating voltage component in same phase.

8. The imaging apparatus as claimed in claim 1, wherein all of the plurality of elongatable portions has an identical size.

9. The imaging apparatus as claimed in claim 1, wherein the number of the elongatable portions is four, and the four elongatable portions are arranged rotation symmetrically about a center axis of the electromechanical transducer.

* * * * *